United States Patent
Soh et al.

(10) Patent No.: US 7,905,647 B2
(45) Date of Patent: Mar. 15, 2011

(54) PRISM SHEET, BACK LIGHT UNIT USING THE SAME AND LIQUID CRYSTAL DISPLAY DEVICE HAVING THE BACK LIGHT UNIT

(75) Inventors: Hoe Sup Soh, Seongnam-si (KR); Man Hoan Lee, Kumi-shi (KR); Ji Su Yoon, Seoul (KR); Sung Keun Lee, Kumi-shi (KR); Jin Hyuk Kwon, Gyeongsan-si (KR)

(73) Assignee: LG. Display Co., Ltd., Seoul (KR)

( * ) Notice: Subject to any disclaimer, the term of this patent is extended or adjusted under 35 U.S.C. 154(b) by 539 days.

(21) Appl. No.: 11/320,250

(22) Filed: Dec. 27, 2005

(65) Prior Publication Data

US 2007/0002586 A1    Jan. 4, 2007

(30) Foreign Application Priority Data

Jun. 29, 2005  (KR) .................. 10-2005-0057012

(51) Int. Cl.
*F21V 7/04* (2006.01)

(52) U.S. Cl. .................. 362/607; 362/620; 362/626

(58) Field of Classification Search .......... 362/600–634, 362/97; 349/56–71
See application file for complete search history.

(56) References Cited

U.S. PATENT DOCUMENTS

| | | | | |
|---|---|---|---|---|
| 5,841,572 A * | 11/1998 | Ando et al. | ................ | 359/454 |
| 5,956,107 A * | 9/1999 | Hashimoto et al. | ............ | 349/64 |
| 5,980,054 A * | 11/1999 | Fukui et al. | .................. | 362/625 |
| 6,002,829 A * | 12/1999 | Winston et al. | ............... | 385/146 |
| RE37,377 E * | 9/2001 | Gunjima et al. | .................. | 349/9 |
| 6,515,785 B1 * | 2/2003 | Cobb et al. | .................... | 359/247 |
| 6,893,136 B2 * | 5/2005 | Yang | ............................ | 362/629 |
| 7,140,743 B2 * | 11/2006 | Yang | ............................ | 362/29 |
| 2004/0008512 A1 * | 1/2004 | Kim | .............................. | 362/235 |
| 2004/0080938 A1 * | 4/2004 | Holman et al. | ............... | 362/231 |
| 2004/0105046 A1 * | 6/2004 | Taira et al. | .................... | 349/61 |
| 2004/0105251 A1 | 6/2004 | Yu et al. | | |
| 2004/0125268 A1 * | 7/2004 | An | ................................. | 349/58 |
| 2005/0275334 A1 * | 12/2005 | Park et al. | .................... | 313/495 |
| 2006/0002107 A1 * | 1/2006 | Jeong | .......................... | 362/225 |
| 2006/0182409 A1 * | 8/2006 | Sudol | ........................... | 385/146 |

FOREIGN PATENT DOCUMENTS

DE    694 24 723    2/2001

(Continued)

OTHER PUBLICATIONS

Office Action dated Jan. 17, 2007 for corresponding German Patent Application No. 10 2005 061 340.3-51. Notification of the First Office Action for corresponding Chinese Patent Application Serial No. 200510132396.6, dated Sep. 7, 2007.
Second Office Action issued in corresponding Chinese Patent Application No. 200510132396.6; issued Apr. 25, 2008.

(Continued)

*Primary Examiner* — Sandra L O'Shea
*Assistant Examiner* — Danielle Allen
(74) *Attorney, Agent, or Firm* — Brinks Hofer Gilson & Lione

(57) ABSTRACT

A prism sheet, a back light unit using the same and liquid crystal display device having the back light unit are disclosed, for improvement of light concentration, frontal luminance and viewing angle, in which the prism sheet includes a light-condensing film. The light condensing film has a plurality of prism peaks, each having a triangular cross section inclined surface which is inclined from a top surface of the light-condensing film at an angle of about 20° to about 40°.

14 Claims, 8 Drawing Sheets

FOREIGN PATENT DOCUMENTS

| | | |
|---|---|---|
| DE | 693 33 355 | 10/2004 |
| EP | 0 573 268 A2 | 12/1993 |
| JP | 08-005805 | 1/1996 |
| JP | 11-295523 | 10/1999 |
| JP | 2003-279988 | 10/2003 |
| WO | WO 94/21094 | 9/1994 |

OTHER PUBLICATIONS

Office Action issued in corresponding Japanese Patent Application No. 2005-374223; mailed Aug. 27, 2008.

Search Report issued in corresponding French Patent Application No. 0513132; issued Dec. 11, 2009.

* cited by examiner

Side Lobe

Side Lobe removed side Lobe

PRISM SHEET, BACK LIGHT UNIT USING THE SAME AND LIQUID CRYSTAL DISPLAY DEVICE HAVING THE BACK LIGHT UNIT

This application claims the benefit of the Korean Patent Application No. P2005-57012, filed on Jun. 29, 2005, which is hereby incorporated by reference as if fully set forth herein.

TECHNICAL FIELD

The present application relates to a back light unit, and more particularly, to a prism sheet, a back light unit using the same and liquid crystal display device having the back light unit, which is suitable for improvement of light concentration, frontal luminance and viewing angle.

BACKGROUND

Various flat panel displays that can reduce weight and volume with respect to that of a cathode ray tube display have been developed. Examples of flat panel displays include a liquid crystal display (LCD), a field emission display (FED), a plasma display panel (PDP), and a light emitting display (LED).

The LCD displays desired images by controlling light beams emitted from a back light unit using an LCD panel. The LCD panel includes a plurality of liquid crystal cells and a plurality of control switches for switching video signals to be supplied to the respective liquid crystal cells.

As shown in FIG. 1, the related art back light unit includes a lamp 10 generating light, a light guide plate 20 emitting a light source through inner dispersion of the light generated from the lamp 10 and entering the light guide plate 20 through an incident surface 22, a lamp housing 12 arranged to surround the lamp 10 and disposed opposite the incident surface 22 of the light guide plate 20, a reflecting plate 30 arranged below the light guide plate 20, a diffusion sheet 40 arranged above the light guide plate 20 to diffuse the light passing through the light guide plate 20, and a prism sheet 50 controlling a direction of the light passing through the diffusion sheet 40.

Generally, the lamp 10 is a cold cathode fluorescent lamp. The lamp 10 is lit by a lamp driving voltage from an inverter (not shown).

The lamp housing 12 has a reflecting surface therein to reflect the light from the lamp 10 toward the incident surface 22 of the light guide plate 20.

The light guide plate 20 allows the incident light from the lamp 10 to reach a portion away from the lamp 10, and guides the incident light to the diffusion sheet 40.

A reflective pattern is formed at a lower side of the light guide plate 20 to reflect the light from the incident surface 22 at a tilted rear surface of the light guide plate 20 and direct the reflected light to the diffusion sheet 40.

The reflecting plate 30 is arranged below the light guide plate 20 so as to reflect a light emerging through the rear surface of the light guide plate 20 back to the light guide plate 20 so as to reduce light loss. The diffusion sheet 40 diffuses the light passing through the light guide plate 20 and emits the light towards the prism sheet 50. The prism sheet 50 serves to condense the light passing through the diffusion sheet 40.

As shown in FIG. 2, the prism sheet 50 includes a condensing film 52 of polyester (PET) and a plurality of prism peaks 54 formed on the condensing film 52 in a stripe shape.

The prism peaks 54 have first and second tilt surfaces tilted at a predetermined angle. Each of the first and second tilt surfaces is tilted with respect to a top surface of the condensing film 52 at an angle of 45°.

The incident light with a predetermined angle θ1 to the prism sheet 50 having a refractive index n1 is refracted by the prism sheet 50 at a predetermined angle θ2 in accordance with the Snell's law of refraction expressed in the following equation 1 the region outside of the prism sheet 50 has a refractive index n2.

$$\frac{n1}{n2} = \frac{\sin\theta1}{\sin\theta2} \qquad \text{equation 1}$$

The light emitted from the lamp 10 proceeds to the diffusion sheet 40 arranged above the light guide plate 20. The diffused light is condensed through the prism sheet 50 and condensed light is finally emitted to the outside.

However, the incident light to the prism sheet 50 can split into three regions, as shown in FIG. 3: viz., a total reflection region, a condensing region, and a side lobe region.

Light ray A of the total reflection region enters the condensing film 52 vertically and is totally internally reflected by the first and second tilt surfaces of the prism peaks 54. The totally reflected light proceeds again to the light guide plate 20. In this way, the light A is condensed by recycling by the reflecting sheet 30.

Light ray B of the condensing region enters the condensing film 52 at an angle and is condensed in such a manner that it is refracted by the lower surface of the prism sheet 50 and one of the first and second tilt surfaces of the prism peaks 54.

Light ray C of the side lobe region enters the condensing film 52 at an angle and is totally internally reflected by one of the first and second tilted surfaces of the prism peaks 54. In this case, light efficiency and viewing angle characteristics are deteriorated.

As shown in FIG. 4 and FIG. 5, a bright region exists at both sides of each of the prism sheet 50 around a symmetrical point due to the side lobe.

As a result, the related art back light unit has some problems due to the structure of the prism sheet 50. That is, viewing angle characteristics are deteriorated by luminance asymmetry in the vertical and horizontal axes (Y and X axes), and condensing efficiency is deteriorated by the side lobe.

SUMMARY

A prism sheet includes a light-condensing film, and a plurality of prism peaks, each prism peak having a triangular cross section surface which is inclined from a top surface of the light-condensing film at an angle of about 20° to about 40°.

In another aspect, a back light unit includes a lamp for generating light; a light guide plate having an incident surface at a side thereof, which directs the light towards a prism sheet, provided on an upper surface the light guide plate, and the prism sheet condenses the light with a plurality of prism peaks, each prism peak having an inclined angle of about 20° to about 40°; and, a reflecting type polarizer, provided on the prism sheet, for increasing any one of S-polarization and P-polarization in the light condensed by the prism sheet.

In another aspect, a back light unit includes a plurality of lamps generating light; a bottom cover supporting the plurality of lamps; a diffusion plate disposed above the lamps; a prism sheet, provided disposed above the diffusion sheet, condensing the light with a plurality of prism peaks, each prism peak having an inclined angle of about 20° to about 40° with respect to the prism sheet; and a reflecting type polarizer, disposed above the prism sheet, for increasing one of a S-polarization or a P-polarization in the light condensed by the prism sheet.

DETAILED DESCRIPTION

Reference will now be made in detail to examples of embodiments which are illustrated in the accompanying drawings. Wherever possible, the same reference numbers will be used throughout the drawings to refer to the same or like parts.

Figure 1:
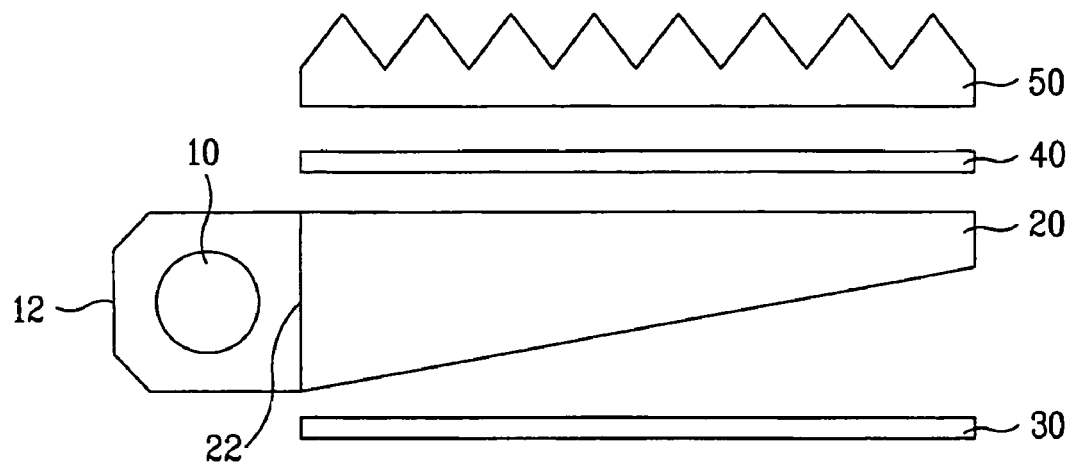
FIG. 1 illustrates a schematic view of a back light unit according to the related art.
Figure 2:
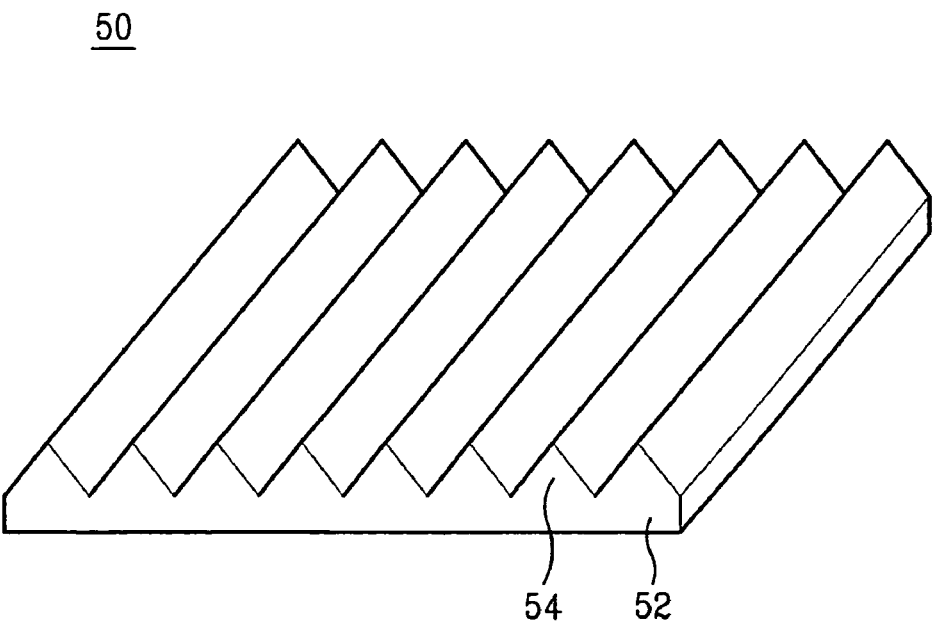
FIG. 2 illustrates a perspective view of a prism sheet shown in FIG. 1.
Figure 3:
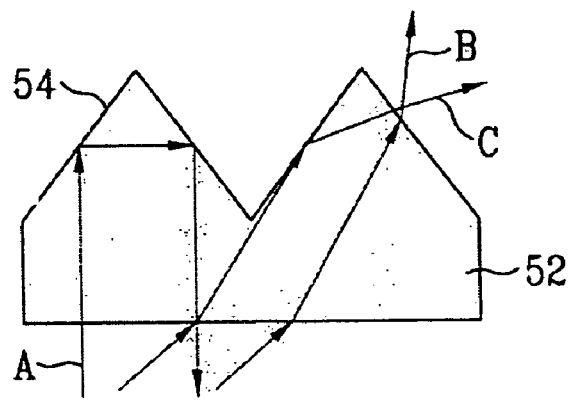
FIG. 3 illustrates the light characteristics of a prism peak shown in FIG. 2.
Figure 4:
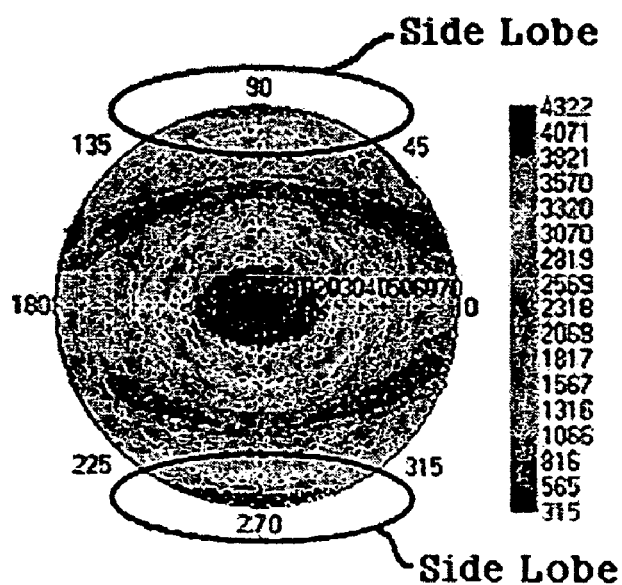
FIG. 4 illustrates the light characteristics and angle distribution of a prism sheet shown in FIG. 2.
Figure 5:
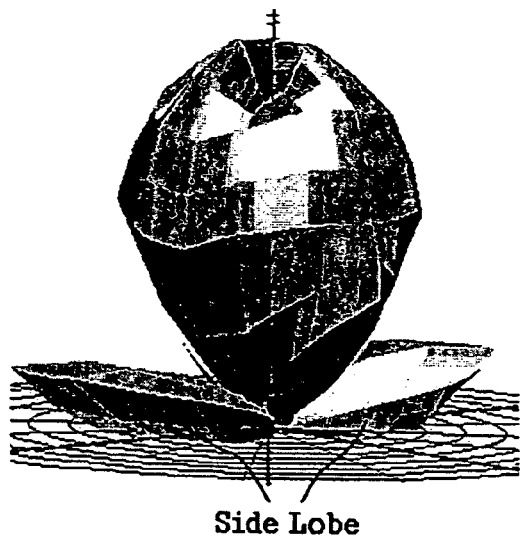
FIG. 5 illustrates the luminance angle distribution of light passing through a prism sheet shown in FIG. 2.
Figure 6:
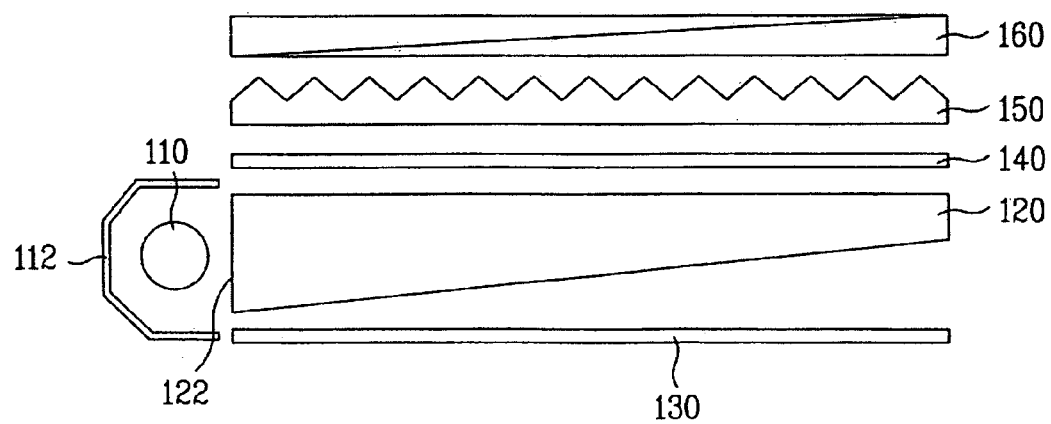
FIG. 6 illustrates a back light unit according to a first example.

The back light unit according to the first example, as shown in FIG. 6, includes a lamp 110, a light guide plate 120, a lamp housing 112, a reflecting plate 130, a diffusion sheet 140, a prism sheet 150, and a reflecting type polarizer 160.

The lamp 110 emits the light, and the light guide plate 120 guides the light which is emitted from the lamp 110 and then is incident upon an incident surface 122. The lamp housing 112 surrounds lamp 110 and is disposed opposing the incident surface 122 of the light guide plate 120. The reflecting plate 130 is provided below the light guide plate 120. The diffusion sheet 140, provided on the light guide plate 120, diffuses the light passing through the light guide plate 120. The prism sheet 150 condenses the light passing through the diffusion sheet 140. The reflecting type polarizer 160 is provided on the prism sheet 150, wherein the reflecting type polarizer 160 increases one of a S-polarization or a P-polarization in the light condensed by the prism sheet 150.

The lamp 110 may be a cold cathode fluorescent lamp. Although not shown, an inverter applies a driving voltage to the lamp 110. The light emitted from the lamp 110 is incident upon the incident surface 122 provided at the side of the light guide plate 120.

The lamp housing 112 is provided at the side of the light guide plate 120, wherein the lamp housing 112 surrounds the lamp 110, and opposes the incident surface 122 of the light guide plate 120. The lamp housing 112 has an inner reflecting surface, whereby the light emitted from the lamp 110 is reflected on the reflecting surface of the lamp housing 112 toward the incident surface 122 of the light guide plate 120.

The light guide plate 120, guides the light to an area apart from the lamp 110, and the incident light is guided toward the diffusion sheet 140. Since the rear surface of the light guide plate 120 is formed of a reflecting pattern, the incident light is reflected on the inclined rear surface of the light guide plate and the light is guided to the diffusion sheet 140.

A reflecting plate 130 is provided below the light guide plate 120. When the light reaches the reflecting plate 130 through the rear surface of the light guide plate 120, the reflecting plate 130 reflects the light back toward the light guide plate 120, thereby decreasing the loss of light.

The diffusion sheet 140 diffuses the light passing through the light guide plate 120, such that the diffused light reaches the prism sheet 150. Then, the prism sheet 150 condenses the light. The prism sheet 150 includes a light-condensing film 152 and a plurality of prism peaks 154. The light-condensing film 152 is formed of polyester PET. The prism peaks 154, each having a triangular cross section of an inclined surface at an angle of about 20° to about 40° with respect to a surface of the prism sheet 150, are formed in a stripe or pyramid shape.

A pyramid shape (not shown) is a configuration which may have a second pair of opposing inclined surfaces, the second pair of surfaces rotated by 90° with respect to the first set of surfaces about an axis perpendicular to the surface of the prism sheet 150. Multiple prisms are disposed along a direction of the stripe.

Each of the prism peaks 154 has an apex angle of about 100° to about 140° and first and second inclined surfaces at an angle of about 20° to about 40° with respect to the surface of the prism sheet 150. Each angle of the first and second inclined surfaces is in an optimized range for removing light rays which would be emitted in a side lobe area.

The incident light ray A which is perpendicular to the diffusion sheet 140 is totally reflected on the first and second inclined surfaces of the prism peaks 154 toward the reflecting plate 130, and the light is recycled. Also, the incident light B and C is refracted on the first and second inclined surfaces of the prism peaks 154, whereby the light is either condensed or totally reflected. Thus, it is possible to substantially eliminate the side lobe.

The reflecting type polarizer 160 increases one of a S-polarization or a P-polarization in the light condensed by the prism sheet 150, thereby improving the frontal luminance and light efficiency.

The reflecting type polarizer 160 transmits the S-polarization of the light passing through the prism sheet 150, and reflects the P-polarization toward the reflecting plate 130. Alternatively, the reflecting type polarizer 160 may transmit the P-polarization, and may reflect the S-polarization to the reflecting plate 130. The luminance angle distribution P(θ) of the reflecting type polarizer 160 may be expressed as equation 2.

$$P(\theta) = p_0 \exp\left(-0.5\left(\frac{\theta}{\sigma}\right)^2\right) \quad \text{equation 2}$$

In formula 2, 'σ' is a full-width half-maximum angle of the luminance distribution which is related with the diffusion intensity of light by a Gaussian characteristic, and 'θ' is an incident angle of the light coming through the prism sheet 150.

The full-width half-maximum angle σ of the reflecting type polarizer 160 has a value of about 0° to about 10°. Accordingly, the value of the luminance angle distribution is optimized in the range between about 0° to about 10°. Thus, it is possible to improve the light-condensing efficiency of the light passing through the prism sheet 150, and to improve the frontal luminance by decreasing or substantially eliminating the light emitted in the side lobe area.

Figure 8A:
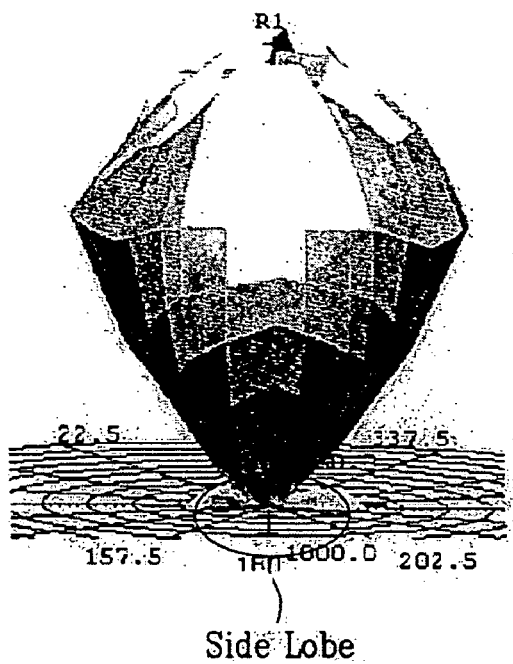
FIG. 8A illustrates the luminance angle distribution of light passing through a prism sheet shown in FIG. 6.
Figure 8B:
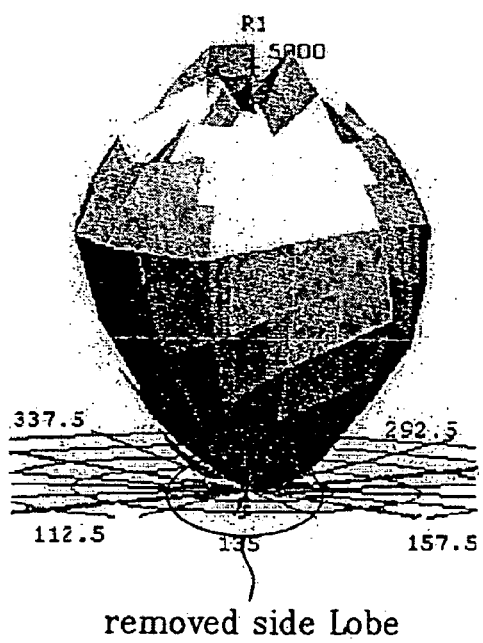
FIG. 8B illustrates the luminance angle distribution of light passing through a reflecting type polarizer shown in FIG. 6.

FIG. 8A illustrates the luminance angle distribution of light passing through the prism sheet shown in FIG. 6. FIG. 8B illustrates the luminance angle distribution of light passing through the reflecting type polarizer shown in FIG. 6.

As shown in FIG. 8A, if the inclined angle of the prism peak 154 is optimized to about 37°, it is possible to minimize the side lobe area in the luminance angle distribution of the light passing through the prism sheet 150.

Also, as shown in FIG. 8B, if the inclined angle of the prism peak 154 is optimized to about 37°, and the full width half maximum angle σ is optimized to about 1°, it is possible to substantially eliminate the side lobe area from the luminance angle distribution of the light passing through the reflecting type polarizer 160.

In the back light unit of the first example, the inclined angle of the prism peak 154 is formed in the optimized range between about 20° to about 40°, and the full width half maximum angle σ of the reflecting type polarizer 160 is formed in the optimized range between about 0° to about 10°. As a result, it is possible to substantially eliminate the side lobe area and to improve the light-condensing efficiency and the frontal luminance.

Figure 9:
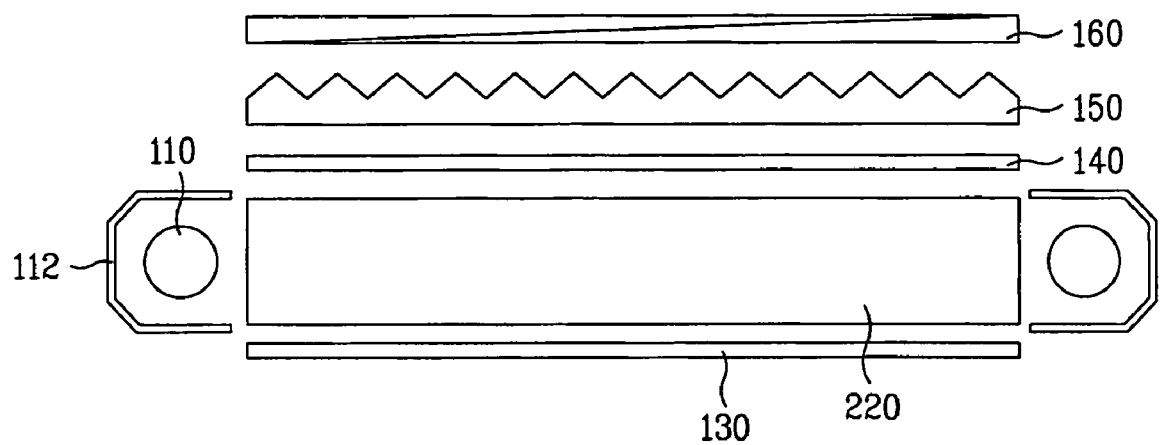
FIG. 9 illustrates a cross sectional view of a back light unit according to a second example.

FIG. 9 illustrates a cross sectional view of a back light unit according to the second example. Referring to FIG. 9, the back light unit according to the second embodiment of the present invention includes a planar-type light guide plate 220, at least one lamp 110, two lamp housings 112, a reflecting plate 130, a diffusion sheet 140, a prism sheet 150, and a reflecting type polarizer 160.

Incident surfaces 222 are provided at both sides of the planar type light guide plate 220. At least one lamp 110 is provided in correspondence with each of the incident surfaces 222. Each of the two lamp housings 112 surrounds the incident surface 222 of the light guide plate 220 and the lamp 110. Also, the reflecting plate 130 is provided below the light guide plate 220. The diffusion sheet 140, provided on the light guide plate 220, diffuses the light passing through the light guide plate 220. The prism sheet 150 condenses the light passing through the diffusion sheet 140. The reflecting type polarizer 160 is provided on the prism sheet 150, wherein the reflecting type polarizer 160 increases any one of S-polarization and P-polarization in the light condensed by the prism sheet 150.

At least one lamp 110 is provided in correspondence with each of the incident surfaces 222 formed at both sides of the light guide plate 220, the back light unit according to the second example is similar in structure as to back light unit according to the first example.

The light emitted from the lamp 110 is incident through the incident surfaces 222 formed at both sides of the light guide plate 220, so it is possible to improve the luminance of light.

An inclined angle of a prism peak 154 formed in the prism sheet 150 is determined in the range between about 20° to about 40°, and a full-width half-maximum angle σ of the reflecting type polarizer 160 is in an optimized range between about 0° to about 10°. As a result, it is possible to substantially eliminate a side lobe area and to improve light-condensing efficiency and frontal luminance.

Figure 10:
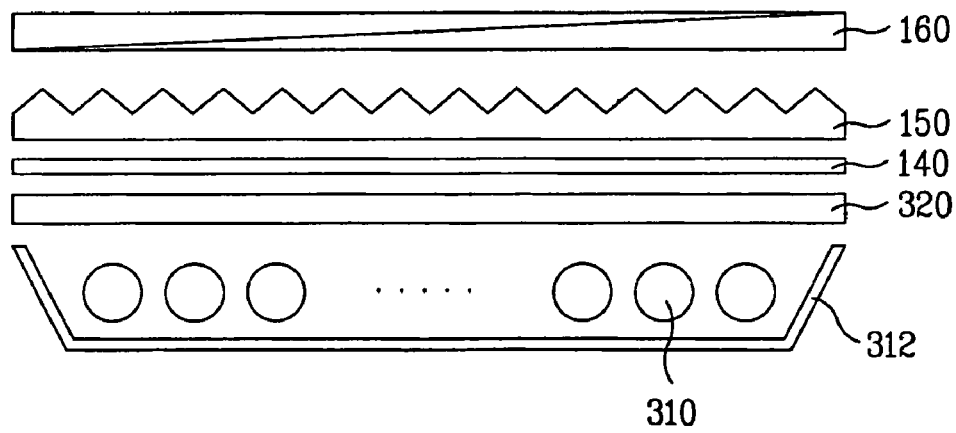
FIG. 10 illustrates a cross sectional view of a back light unit according to a third example.

FIG. 10 illustrates a cross sectional view of a back light unit according to the third example. The back light unit includes a plurality of lamps 310, a bottom cover 312, a diffusion plate 320, a prism sheet 150, and a reflecting type polarizer 160.

The plurality of lamps 310 mounted on the back cover 312 emit light. The diffusion plate 320 is disposed above the lamps 310 such that the diffusion plate 320 diffuses the light emitted from the plurality of lamps 310. The prism sheet 150, provided over the diffusion plate 320, condenses the light diffused by the diffusion plate 320. The reflecting type polarizer 160 is provided on the prism sheet 150, whereby the reflecting type polarizer 160 increases one of a S-polarization or a P-polarization in the light condensed by the prism sheet 150.

Each of the lamps 310 may be a cold cathode fluorescent lamp. Although not shown, an inverter applies a driving voltage to the lamp 310. The light emitted from the lamps 310 is incident upon a rear surface of the diffusion plate 320.

The bottom cover 312 supports the plurality of lamps 310. In addition, a reflecting sheet (not shown) may be adhered to the inner surface of the bottom cover 312, such that the reflecting sheet reflects the light emitted from the lamps 310 to the diffusion plate 320.

The diffusion plate 320 covers the top of the bottom cover 312 above the lamps 310. Thus, the light emitted from the lamps 310 and reflected on the reflecting sheet of the bottom cover 312 is diffused by the diffusion sheet 320, and then the diffused light is incident upon the prism sheet 150.

Figure 7:
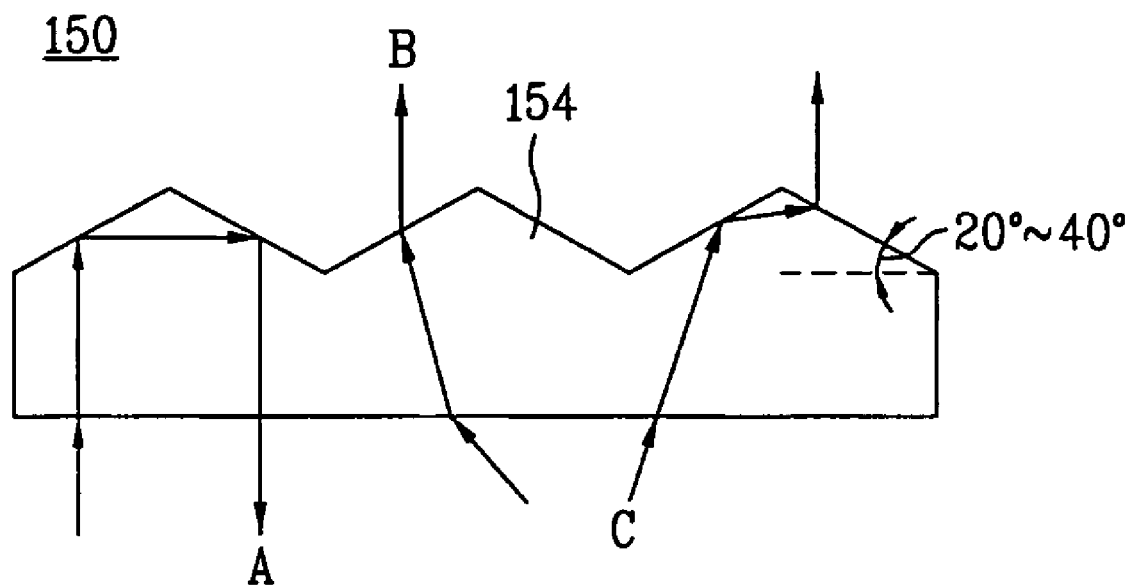
FIG. 7 illustrates a cross sectional view of a prism sheet shown in FIG. 6.

The prism sheet 150 of the back light unit of third example is similar in structure to a prism sheet of the back light unit of the first example shown in FIG. 7. Accordingly, a detailed explanation for the prism sheet 150 of the back light unit of the third example.

The reflecting type polarizer 160 of the back light unit of the third example is similar in structure to the reflecting type polarizer of the back light unit of the first example shown in FIG. 6. Accordingly, a detailed explanation of the reflecting type polarizer 160 will be omitted.

The light emitted from the lamps 310 is may be directly incident on the rear surface of the diffusion sheet 140, thereby improving the luminance of light.

An inclined angle of a prism peak 154 formed in the prism sheet 150 is in an optimized range between about 20° to about 40°, and a full-width half-maximum angle σ of the reflecting type polarizer 160 is formed in a range between about 0° to about 10°. As a result, it is possible to substantially eliminate a side lobe area and to improve light-condensing efficiency and frontal luminance.

Figure 11:
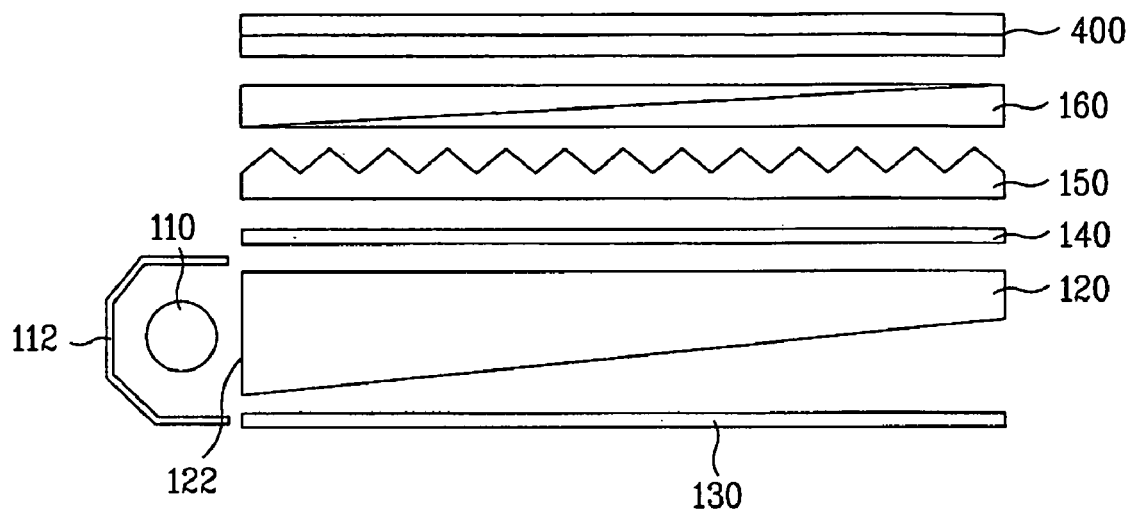
FIG. 11 illustrates a cross sectional view of a liquid crystal display device having the back light unit according to the first example.
Figure 12:
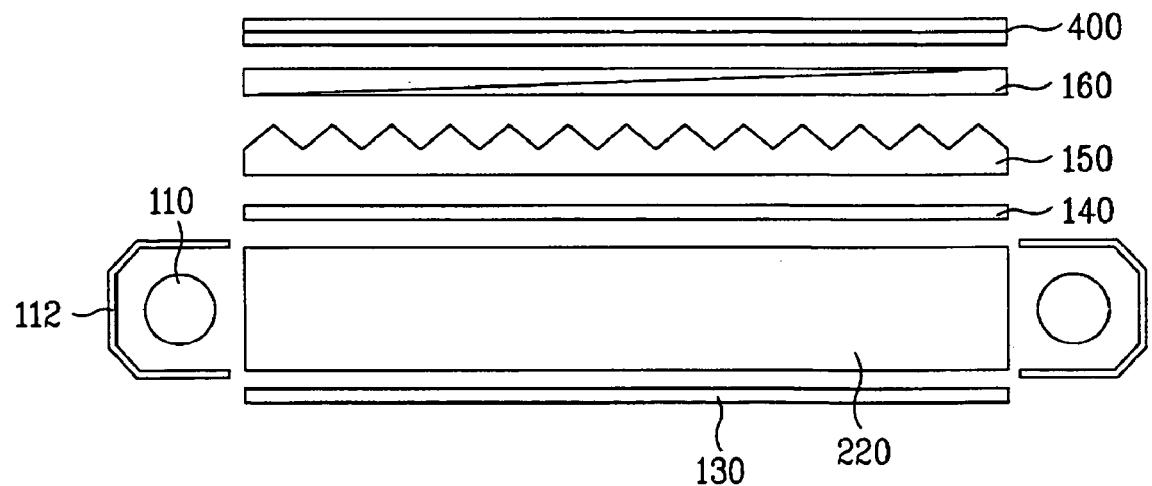
FIG. 12 illustrates a cross sectional view of a liquid crystal display device having the back light unit according to the second example.
Figure 13:
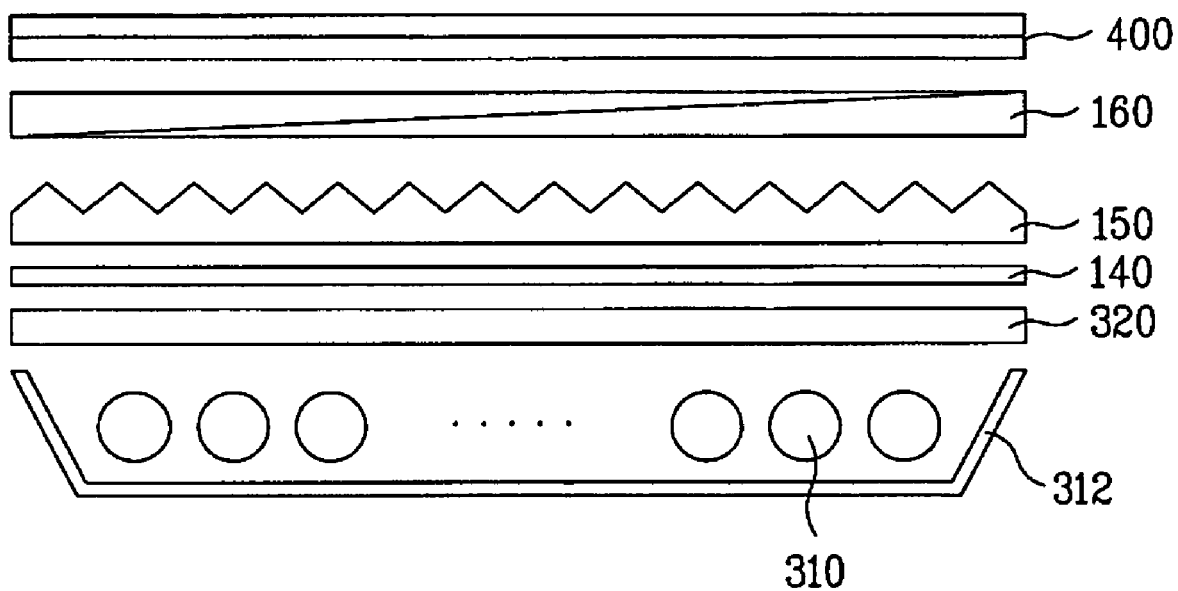
FIG. 13 illustrates a cross sectional view of a liquid crystal display device having the back light unit according to the third example.

Each of the back light units of the first to third examples may be used as a light source for emitting light to a liquid crystal display panel 400 shown in FIG. 11 to FIG. 13. The liquid crystal display panel 400 may be driven in any of an IPS (In Plane Switching) mode, a VA (Vertically Aligned) mode, a TN (Twisted Nematic) mode, or an MD (Multi-Domain) mode.

The liquid crystal display panel 400 includes a thin film transistor substrate, a color filter substrate, and a liquid crystal layer. The thin film transistor substrate includes a plurality of liquid crystal cells arranged in regions defined by a plurality of gate and data lines, and a plurality of thin film transistors serving as switching elements formed in the respective liquid crystal cells. The liquid crystal layer is formed between thin film transistor substrate and the color filter substrate, wherein the thin film transistor substrate is disposed at a separation interval from the color filter substrate. The liquid crystal display panel 400 displays desired images by forming an electric field in the liquid crystal layer depending on data signals to control light transmission.

It will be apparent to those skilled in the art that various modifications and variations can be made in the present invention without departing from the spirit or scope of the inventions. Thus, it is intended that the present invention covers the modifications and variations of this invention provided they come within the scope of the following claims and their equivalents.

What is claimed is:

1. A back light unit comprising:
   a lamp for generating light;
   a light guide plate having an incident surface at a side thereof;
   a prism sheet, disposed opposing an emitting surface of the light guide plate, for condensing the light with a plurality of prism peaks, each prism peak having an inclined angle of 37° with respect to a top surface of the prism sheet, wherein the plurality of prism peaks are formed directly on the top surface of the prism sheet; and
   a reflecting type polarizer, provided on the prism sheet, for transmitting one of a S-polarization or a P-polarization and reflecting the other of the S-polarization or the P-polarization below, in the light condensed by the prism sheet,
   wherein the reflecting type polarizer has a full-width half-maximum angle in a luminance angle distribution of 1°;
   wherein the full-width half-maximum angle is an angle between a virtual vertical line passing through the prim sheet vertically and a direction of the light emitted from the prism sheet;
   wherein the vertical line is vertical to the top surface of the prism sheet.

2. The back light unit of claim 1, wherein the lamp is positioned at one side or both sides of the light guide plate.

3. The back light unit of claim 1, wherein the plurality of prism peaks are formed in stripe.

4. The back light unit of claim 1, further comprising:
   a lamp housing, provided at one side or both ends of the light guide plate, for surrounding the lamp and disposed opposite an incident surface of the light guide plate;
   a diffusion sheet, provided between the light guiding plate and the prism sheet, for diffusing the light passing through the light guide plate; and
   a reflecting plate positioned below the light guide plate.

5. A back light unit comprising:
   a plurality of lamps for generating light;
   a bottom cover supporting the plurality of lamps;
   a diffusion plate disposed above the lamps;
   a prism sheet, disposed above the diffusion plate, having a plurality of prism peaks, each prism peak having an inclined angle of 37° with respect to a top surface of the prism sheet, wherein the plurality of prism peaks are formed directly on the top surface of the prism sheet; and
   a reflecting type polarizer, disposed on the prism sheet, for transmitting one of a S-polarization or a P-polarization and reflecting the other of the S-polarization or the P-polarization below, in the light condensed by the prism sheet,
   wherein the reflecting type polarizer has a full-width half-maximum angle in a luminance angle distribution of 1°;
   wherein the full-width half-maximum angle is between a virtual vertical line passing through the prism sheet vertically and a direction of the light emitted from the prism sheet;
   wherein the vertical line is vertical to the top surface of the prism sheet.

6. The back light unit of claim 5, wherein the plurality of prism peaks are formed in stripe.

7. A liquid crystal display device comprising:
   a liquid crystal display panel for displaying images; and
   a back light unit for emitting light to the liquid crystal display panel,
   wherein the back light unit includes a lamp for generating light, a light guide plate having an incident surface at a side thereof, a prism sheet disposed opposing an emitting surface of the light guide plate, for condensing the light with a plurality of prism peaks, each prism peak having an inclined angle of 37° with respect to a top surface of the prism sheet, and a reflecting type polarizer provided on the prism sheet, for transmitting one of a S-polarization or a P-polarization and reflecting the other of the S-polarization or the P-polarization below, in the light condensed by the prism sheet,
   wherein the plurality of prism peaks are formed directly on the top surface of the prism sheet;
   wherein the reflecting type polarizer has a full-width half-maximum angle in a luminance angle distribution of 1°;
   wherein the full-width half-maximum angle is an angle between a virtual line passing through the prism sheet vertically and a direction of the light emitted from the prism sheet;
   wherein the vertical line is vertical to the top surface of the prism sheet.

8. The liquid crystal display device of claim 7, wherein the lamp is positioned at one side or both sides of the light guide plate.

9. The liquid crystal display device of claim 7, wherein the plurality of prism peaks are formed in stripe.

10. The liquid crystal display device of claim 7, wherein the back light unit further includes:
    a lamp housing, provided at a side of the light guide plate, for surrounding the lamp and opposing the incident surface of the light guide plate;
    a diffusion sheet, provided between the light guiding plate and the prism sheet; and
    a reflecting plate positioned below the light guide plate.

11. The liquid crystal display device of claim 7, wherein a liquid crystal mode is any one of an IPS (In Plane Switching) mode, a VA (Vertically Aligned) mode, a TN (Twisted Nematic) mode, or an MD (Multi-Domain) mode.

12. A liquid crystal display device comprising:
    a liquid crystal display panel for displaying images; and
    a back light unit for emitting light to the liquid crystal display panel,
    wherein the back light unit includes a plurality of lamps for generating light, a bottom cover supporting the plurality of lamps, a diffusion plate disposed above the lamps, a prism sheet, disposed above the diffusion plate, having a plurality of prism peaks, each prism peak having an inclined angle of 37° with respect to a top surface of the prism sheet, and a reflecting type polarizer provided on the prism sheet, for transmitting one of a S-polarization or a P-polarization and reflecting the other of the S-polarization or the P-polarization below, in of the light condensed by the prism sheet,
    wherein the plurality of prism peaks are formed directly on the top surface of the prism sheet;

wherein the reflecting type polarizer has a full-width half-maximum angle in a luminance angle distribution of 1°;

wherein the full-width half-maximum angle is an angle between a virtual vertical line passing through the prism sheet vertically and a direction of the light emitted from the prism sheet;

wherein the vertical line is vertical to the top surface of the prism sheet.

13. The liquid crystal display device of claim 12, wherein the plurality of prism peaks are formed in stripe.

14. The liquid crystal display device of claim 12, wherein a liquid crystal panel mode is any of an IPS (In Plane Switching) mode, a VA (Vertically Aligned) mode, a TN (Twisted Nematic) mode, or an MD (Multi-Domain) mode.

* * * * *